United States Patent [19]

Tershak

[11] Patent Number: 4,821,528
[45] Date of Patent: Apr. 18, 1989

[54] FAULT TOLERANT CONTROL FOR A REFRIGERATOR

[75] Inventor: Andrew T. Tershak, Center Township, Vanderburgh County, Ind.

[73] Assignee: Whirlpool Corporation, Benton Harbor, Mich.

[21] Appl. No.: 154,575

[22] Filed: Feb. 10, 1988

Related U.S. Application Data

[62] Division of Ser. No. 946,914, Dec. 22, 1986, Pat. No. 4,741,170.

[51] Int. Cl.⁴ .............................................. F25B 49/00
[52] U.S. Cl. .................................... 62/228.1; 62/229; 62/187; 62/126; 62/127
[58] Field of Search .................. 62/126, 127, 129, 130, 62/131, 187, 215, 226, 227, 229, 228.1, 228.3, 228.4, 228.5; 165/11.1; 236/94

[56] References Cited

U.S. PATENT DOCUMENTS

| | | | |
|---|---|---|---|
| 4,307,775 | 12/1981 | Saunders et al. | 62/127 X |
| 4,333,316 | 6/1982 | Stamp, Jr. et al. | 62/160 X |
| 4,381,549 | 4/1983 | Stamp, Jr. et al. | 62/160 X |
| 4,432,210 | 2/1984 | Saito | 62/126 |
| 4,598,355 | 7/1986 | Shepler et al. | 364/431.01 X |
| 4,646,528 | 3/1987 | Marcade et al. | 62/127 |

Primary Examiner—Harry B. Tanner
Attorney, Agent, or Firm—Lowe, Price, LeBlanc, Becker & Shur

[57] ABSTRACT

In an improved control for a refrigerator, critical components such as fresh food and freezer compartment temperature sensors, temperature set devices and baffle are sampled to conform that each is operational. Upon diagnosis of a critical component failure or of multiple component failures, the control, using stored control parameters, operates the remaining components in a manner that will continue to preserve food.

8 Claims, 9 Drawing Sheets

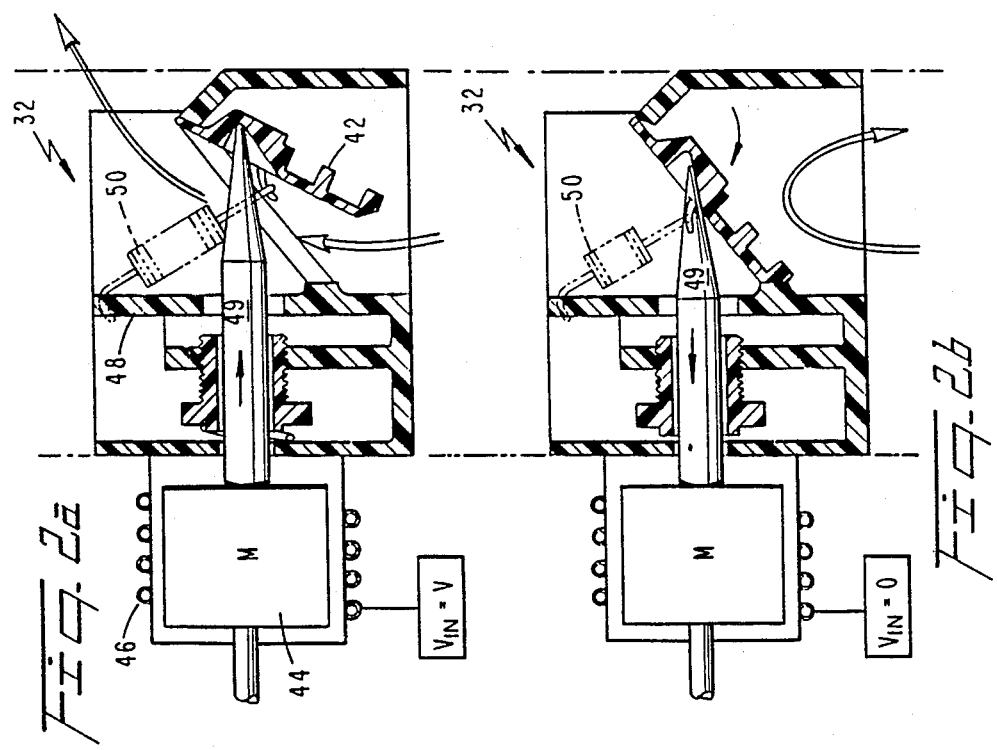
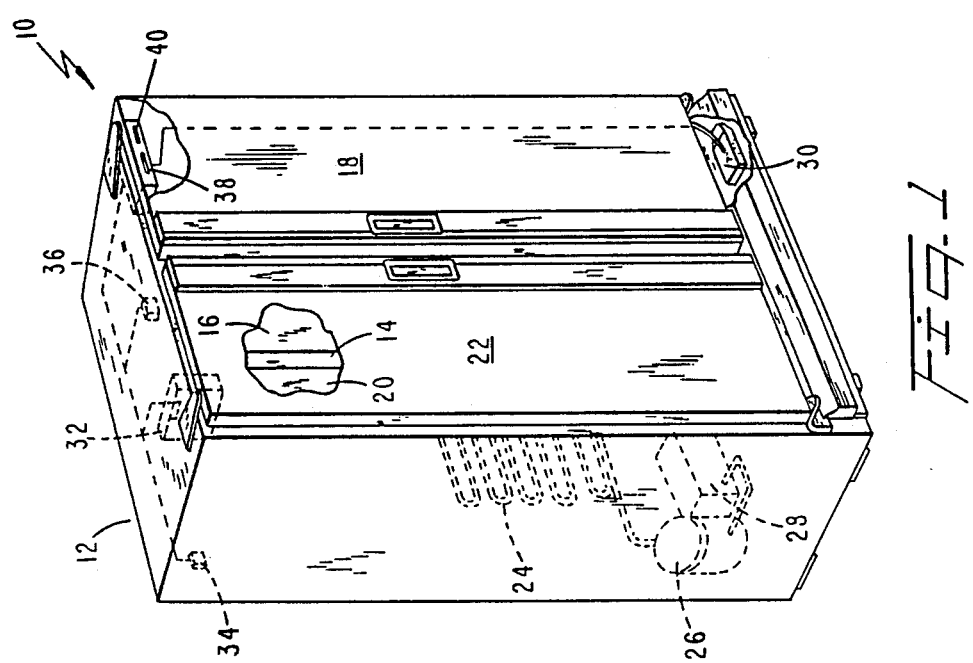

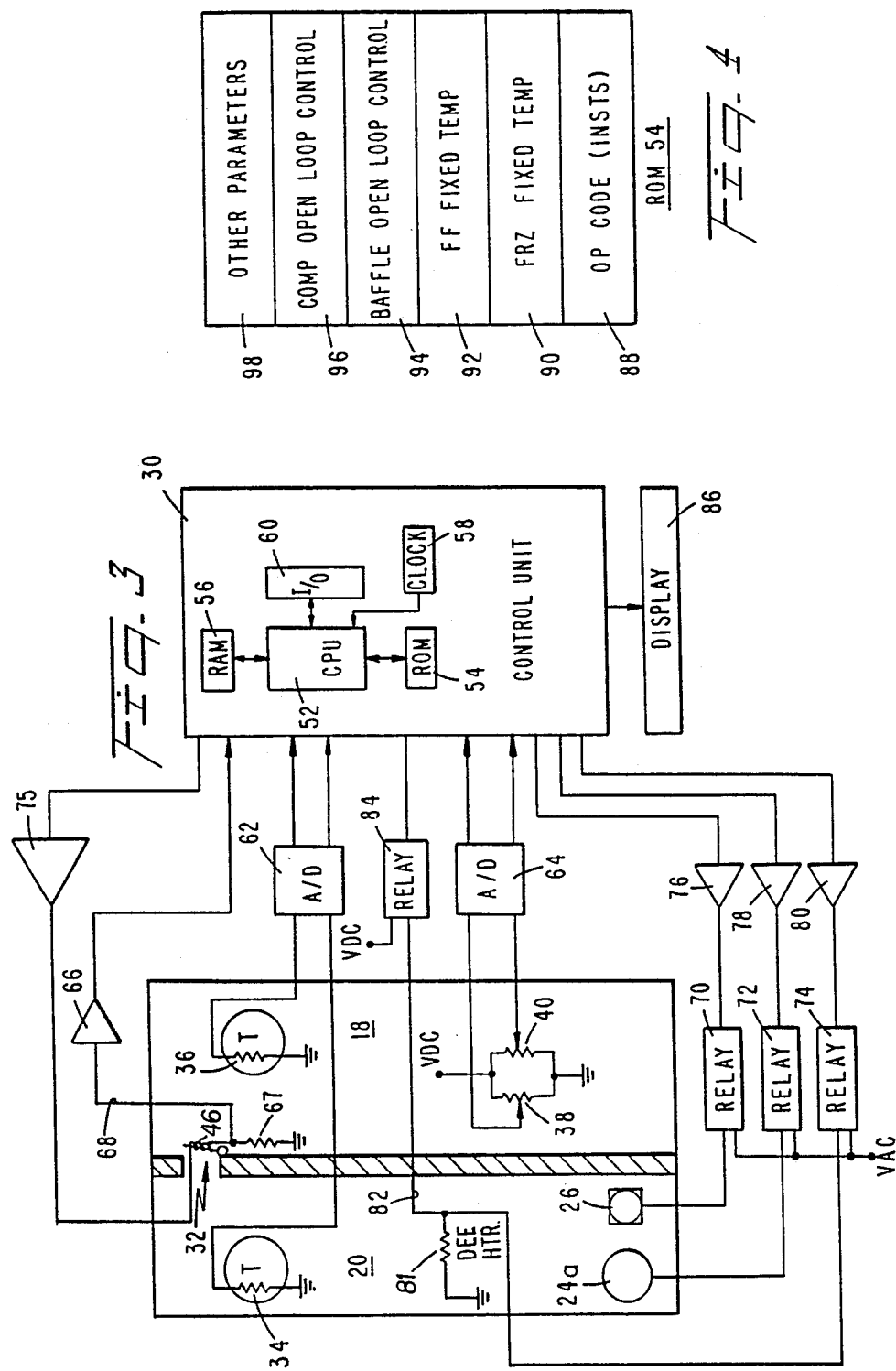

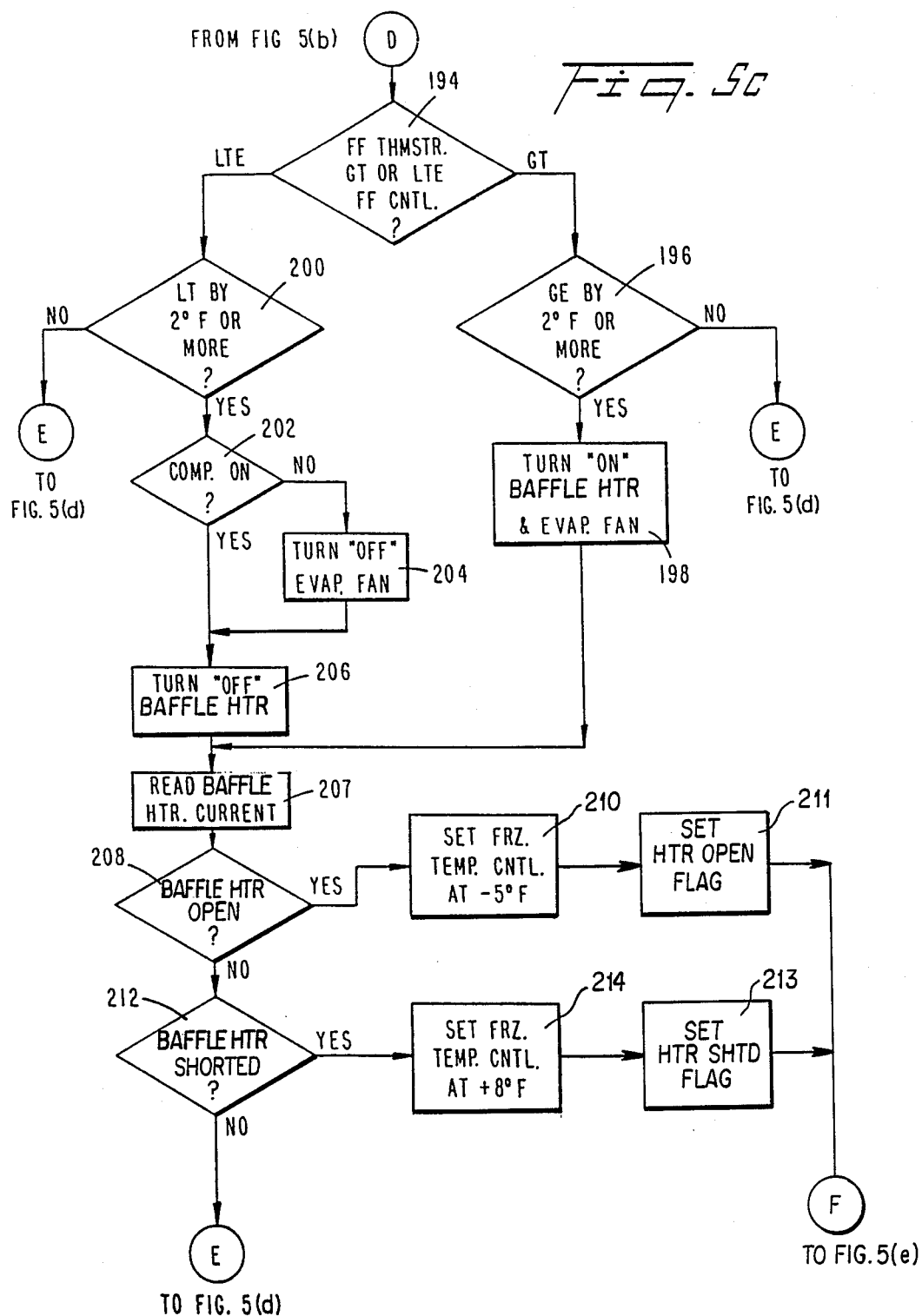

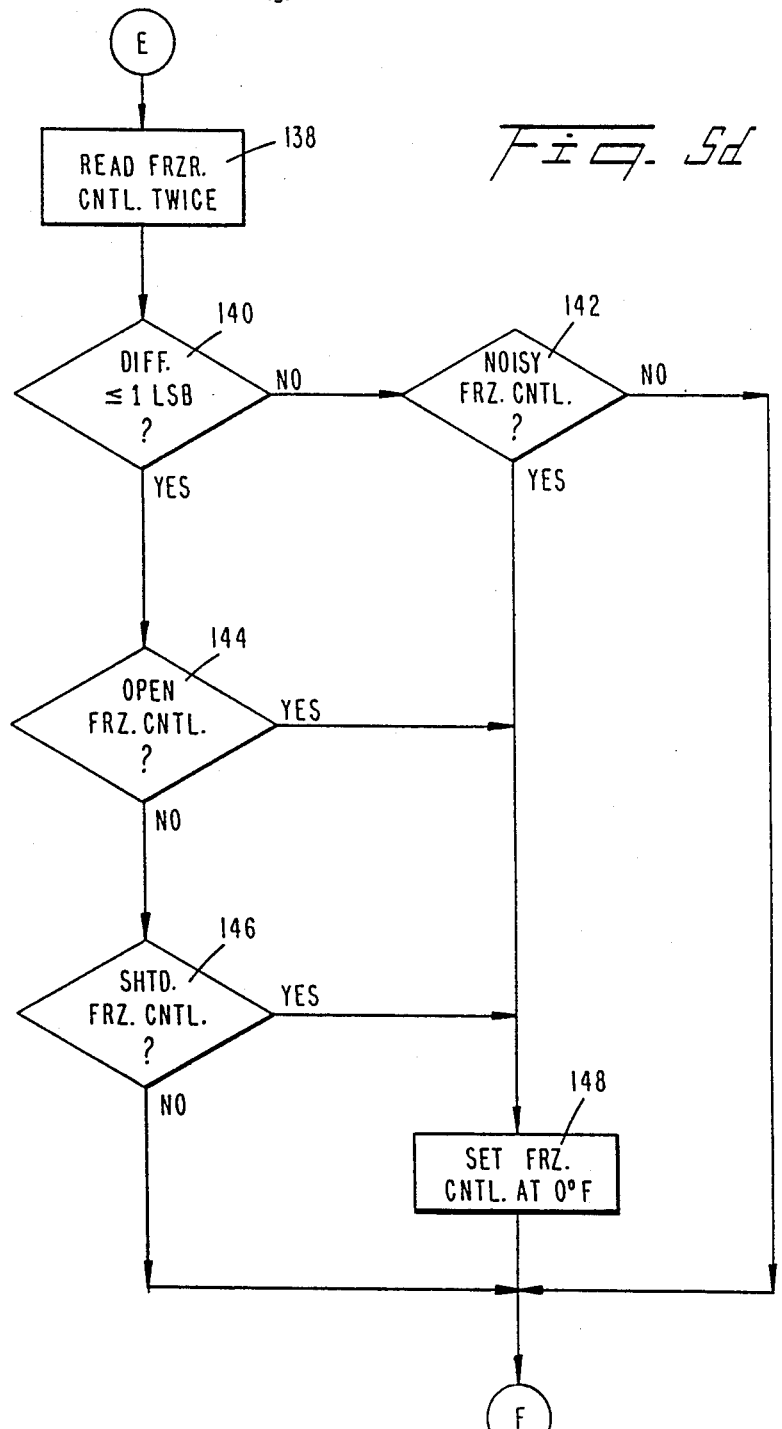

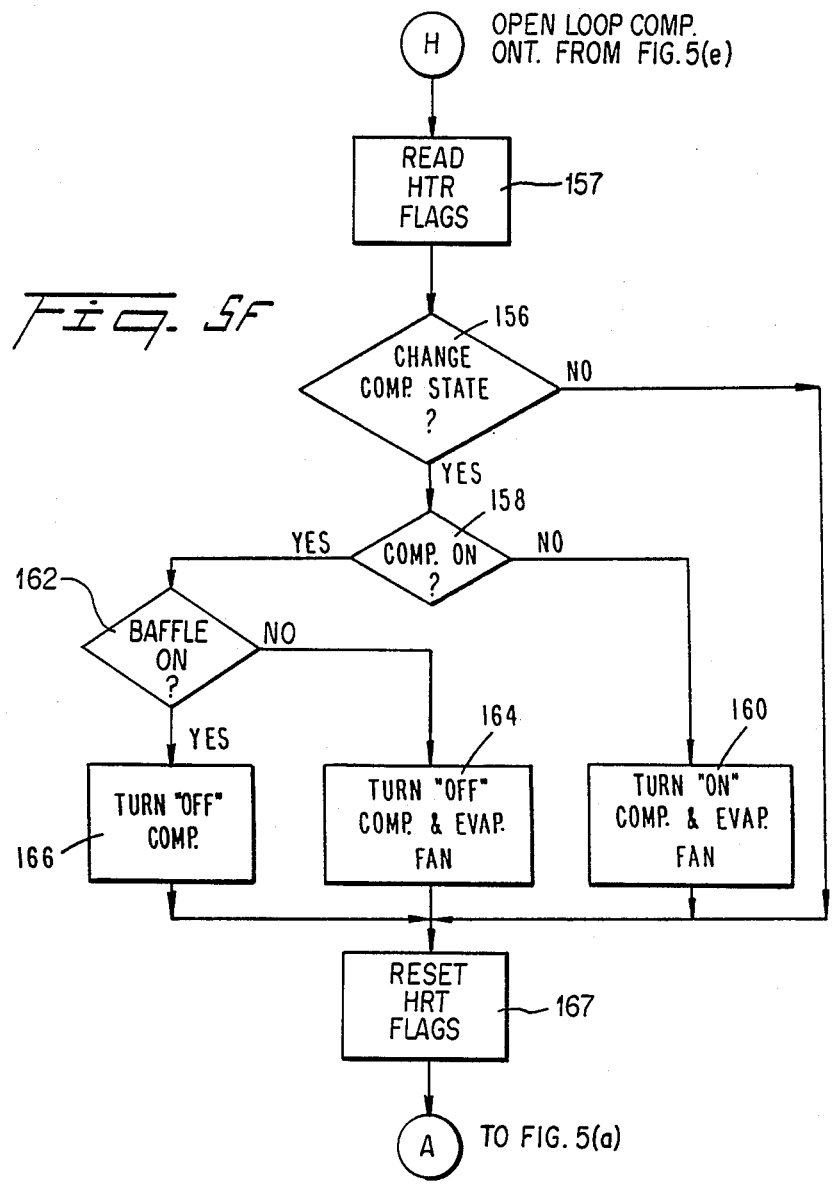

FAULT TOLERANT CONTROL FOR A REFRIGERATOR

This is a division of application Ser. No. 946,914 filed Dec. 12, 1986 now U.S. Pat. No. 4,741,170.

TECHNICAL FIELD

The present invention relates generally to refrigerator controls, and more particularly, to a control that diagnoses failures in critical components of a refrigerator and in response operates the refrigerator using the remaining components in a manner to preserve food.

BACKGROUND ART

Various control schemes are known to sense and diagnose a failure in a refrigeration unit. However, most such schemes can continue to operate the unit only if the failed component is not a critical input or output component or if there is an alternative component that can substitute for the failed one. Component redundancy increases the complexity as well as the cost of the control.

In U.S. Pat. No. 4,327,556, failure of the defrost heater in a refrigerator to cycle is detected by a microprocessor. In response to a failed heater, the microprocessor connects an override relay in circuit with the heater to cycle the heater on and off. This system, however, cannot continue to operate a refrigerator upon a failure of critical input components, such as a food compartment temperature sensor or temperature setting control, or upon a failure of any critical output component, such as a baffle, that otherwise would result in spoilage of food.

In another type of refrigeration system, an internal diagnostics routine executed by a microprocessor tests the condition of a temperature sensor in the refrigerator. In response to a fault, i.e., an open circuited or short circuited sensor, the compressor is cycled on and off with a predetermined duty cycle to cool the fresh food and freezer compartments of the refrigerator. This system, although effective to prevent spoilage of food caused by a failed temperature sensor, is not capable of adequately preserving food in the event of other types of component failures, such as a failed baffle, or in the event of multiple component failures, such as a short-circuited temperature sensor and a stuck baffle occurring at the same time.

An object of this invention accordingly is to provide a method of and system for controlling a refrigerator to accommodate the failure of what is usually considered to be an essential input or output device in a manner that continues to preserve the food being stored.

Another more specific object of the invention is to provide a method of and system for detecting the failure of a baffle of a refrigerator and in response operating the refrigerator in a manner to continue to suitably preserve food.

A further object of the invention is to provide a method of and system for detecting multiple component failures in a refrigeration control, identifying the components failed and operating the refrigerator using non-failed components to continue to preserve food.

Another object is to provide an improved system for diagnosing failed critical components of a refrigerator, taking corrective action to continue to preserve food and generating an alarm to identify to service personnel the nature of the failure diagnosed.

An additional object is to provide a microprocessor implemented control for a refrigerator that diagnoses failed critical input and output components of the refrigerator and in response carries out control using non-failed components to continue to preserve food.

A still further object of the invention is to provide fault tolerant control of an appliance without requiring component redundancy.

There is a tendency for control components within a refrigerator to be exposed to sources of electrical noise and to develop internal noise as a result of thermal effects and deterioration over time. Failure diagnosis systems of the prior art have a tendency to misinterpret noise superimposed on a component as a valid signal having a particular instantaneous value and in response take inappropriate action.

A further object of the invention, therefore, is to provide in a refrigerator control system a method of and system for detecting a "noisy" control component.

A still further object is to provide a method of and system for controlling a refrigerator in a manner to continue to preserve food stored therein upon diagnosis of a "noisy" critical control component.

SUMMARY OF THE INVENTION

A refrigerator of a type to which the invention is applied has a fresh food compartment and a freezer compartment maintained at user selected temperatures by a compressor that directs chilled air into the freezer compartment and a baffle which controls flow of chilled air from the freezer compartment into the fresh food compartment. The compressor and baffle are controlled by a control device in response to temperature setting devices and temperature sensors associated with the two compartments to achieve the user selected compartment temperatures.

Critical refrigerator control components, such as the user controlled, food preservation compartment temperature setting device and compartment temperature sensor, which upon a failure would cause a failure of the refrigeration system, are monitored. Fixed control parameters associated with various component failure modes are stored in a memory associated with the control device. Upon diagnosis of a failed critical component, control of the refrigeration system is carried out using a fixed control parameter stored in the memory rather than using the failed component, to continue to preserve the food.

Preferably, the baffle is of a type having a movable baffle element that is responsive to an electrical resistance heater, and the failure mode of the baffle is diagnosed in accordance with the condition, i.e., open or shorted, of the heater. In accordance with one aspect of the invention, if the baffle has failed open, the temperature setting of the freezer compartment is raised in accordance with a stored control parameter to prevent food in the fresh food compartment from freezing. If the baffle has failed closed, the setting of the freezer compartment is lowered in accordance with another stored control parameter to cool the fresh food compartment by radiation or conduction through the divider wall of the refrigerator cabinet.

In accordance with another aspect of the invention, if multiple failures are diagnosed, open loop control of an output component is carried out. For example, if the freezer compartment temperature sensor fails and the baffle is stuck closed, the compressor is cycled at a first duty cycle in accordance with one of the stored control parameters. If the freezer compartment temperature sensor fails and the baffle is stuck open, the compressor is cycled at a second, lower, duty cycle in accordance with another one of the stored control parameters to avoid freezing food in the fresh food compartment.

In accordance with a further aspect of the invention, noisy components are diagnosed by taking multiple successive measurements for each component reading. Only if at least two successive measurements match is the reading accepted. A component is classified as "noisy" if at least a predetermined number of mismatches occur. Noisy temperature sensors are treated as failed. A noisy baffle resistance heater is cycled in an open loop mode in accordance with one of the stored control parameters.

Other features of the invention will be apparent from the following description and from the drawings. While an illustrative embodiment of the invention is shown in the drawings and will be described in detail herein, the invention is susceptible of embodiment in many forms and it should be understood that the present diclosure is to be considered as an exemplification of the principles of the invention and it is not intended to limit the invention to the embodiment illustrated.

BRIEF DESCRIPTION OF THE DRAWINGS

FIG. 1 is a perspective view of a refrigerator containing the improved control of this invention;

FIGS. 2a and 2b are cross sectional views of a baffle used in the invention, in open and closed positions, respectively;

FIG. 3 is a block diagram of the improved control;

FIG. 4 is a diagram of a portion of the ROM of FIG. 3 containing stored control parameters; and FIGS. 5a–5g are a flow chart of programming for operating the control.

DETAILED DESCRIPTION OF A PREFERRED EMBODIMENT

Figure 5A:
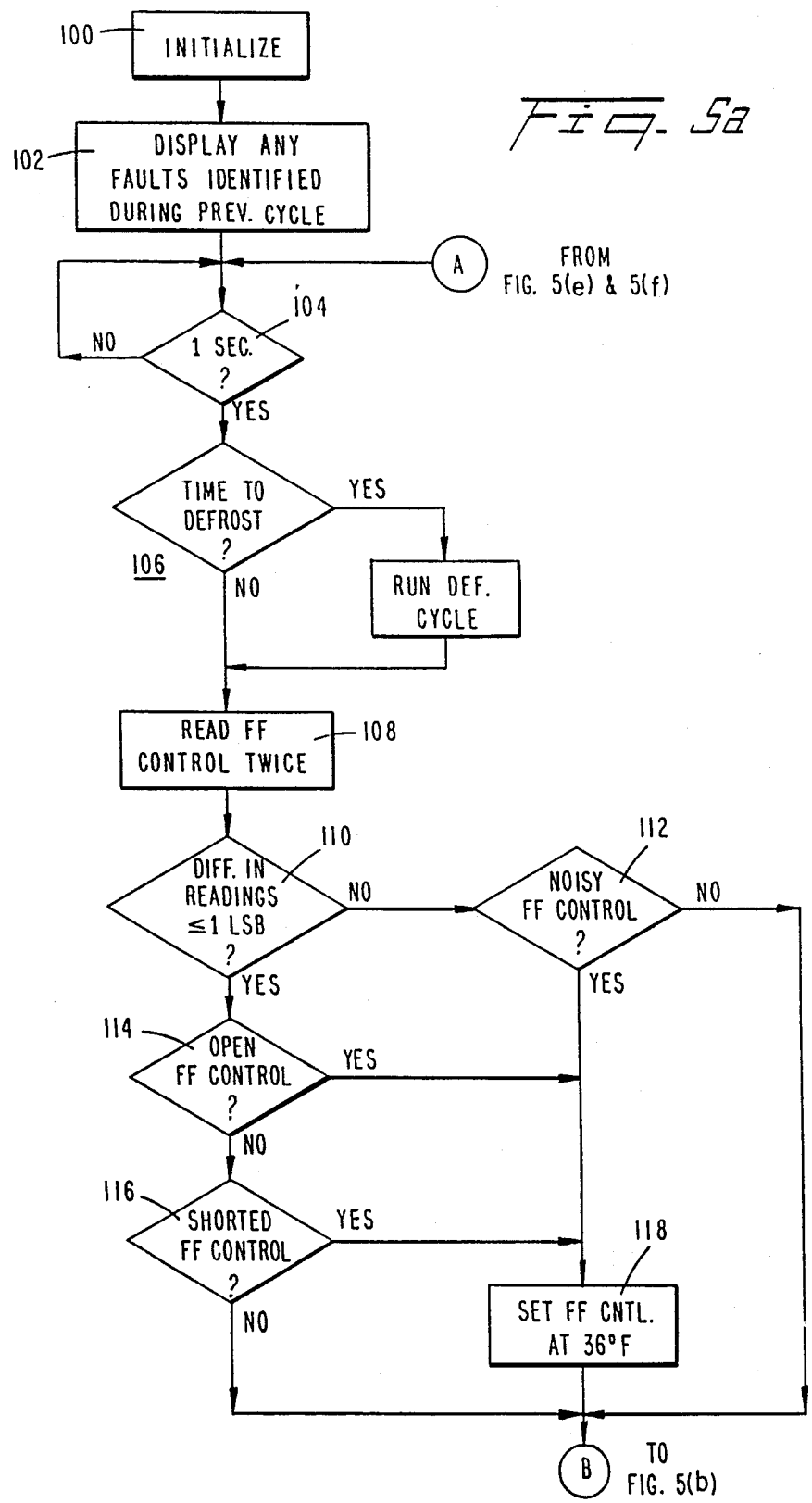

Referring to FIG. 1, a conventional refrigerator 10 controlled in accordance with the principles of the invention, comprises a cabinet 12 having a divider wall 14 for separating the space within the cabinet into a fresh food compartment 16, which is enclosed by a fresh food door 18, and a freezer compartment 20, enclosed by a freezer door 22.

Air is refrigerated as a result of being passed in heat exchange relationship with an evaporator 24, which is interconnected through appropriate tubing to a conventional compressor 26 and condenser 28, as well as other conventional refrigeration components (not shown) all preferably disposed within a compartment located below the fresh food and freezer compartments 16 and 20.

Chilled air is directed from the evaporator 24 through appropriate ducts into the freezer compartment 20. The compressor 26 is cycled on and off by an electronic control 30 to maintain the freezer compartment at a user selected temperature, usually at about zero degree Fahrenheit.

Within the divider wall 14 is an opening within which is located a baffle 32 that controls flow of chilled air from the freezer compartment 20 into the fresh food compartment 16. The temperature of the fresh food compartment 16 thus is determined by the position of the baffle 32 as well as by the operation of the compressor 26.

The control 30, which shall be described in more detail below, receives the outputs of a first temperature sensor 34, preferably a thermistor, located within the freezer (FRZ) compartment 20 and another like temperature sensor 36, positioned in the fresh food (FF) compartment 16, to control the compartment temperatures. The user selected freezer and fresh food compartment temperature set points are supplied to the control 30 by temperature set point selection devices 38 and 40 positioned within the fresh food compartment 16 and accessible to the user.

The baffle 32 is preferably of a type shown in FIGS. 2a and 2b wherein a movable baffle element 42 is controlled by a heat responsive motor 44 thermally coupled to an electric resistance heater 46. The movable baffle element 42 is maintained normally closed by a spring 50 having one end anchored to baffle housing 48. However, other types of baffles can be used herein.

Details of the construction and operation of the baffle 32 in accordance with the preferred embodiment are given in U.S. Pat. No. 4,530,216, incorporated herein by reference. Briefly, the movable baffle element 42 is indexed between the open position shown in FIG. 2a and the closed position shown in FIG. 2b by a plunger 49 moved selectively by motor 44 into the two positions shown. The motor 44 preferably is a bellows which, when warmed by a voltage V applied to electrical resistance heater 46, drives the plunger 49 in the position of the arrow in FIG. 2a, pivoting the movable baffle element 42 open. When no voltage is applied to the heater 46, the bellows cools, and the plunger 38 moves in the direction of the arrow in FIG. 2b as movable baffle member 42 is closed by spring 50.

Cold air passes from the freezer compartment 20 to the fresh food compartment 16 only when the baffle 32 is open, as shown in FIG. 2a. Voltage applied to the electrical resistance heater 46 to open the baffle is provided by control 30 if cooling of the fresh food compartment 16 is required.

Maintenance of the freezer compartment 30 and fresh food compartment 16 at the desired temperatures requires, among other things, the proper operation of the compartment temperature sensors 34, 36, temperature set point selection devices 38, 40 and baffle 32. If there is a failure of one or more of those components, the refrigeration system may under certain circumstances "shut down", causing the stored food to spoil. As another possibility, the compressor 26, may as a result of failure of particular components, run continuously causing the food in the fresh food compartment to freeze.

For example, if thermistor 34 becomes open circuited, its output will be corresponded to a temperature below the set point of the freezer compartment 20 and the compressor 26 will always be turned off. On the other hand, if the thermistor 34 becomes short-circuited, its output will correspond to a temperature higher than the set temperature of the freezer compartment 20, and the compressor 26 will always be maintained on. Similar faults occur as a result of failure of the temperature setting devices 38, 40 and the heater 46 of baffle 32.

To detect failure of any critical input and output components, the components are periodically sampled by the control 30. If a failed component is diagnosed, control of the refrigerator using non-failed components is carried out by the control in a manner to continue to preserve food stored in the freezer and fresh food compartments.

Referring to FIG. 3, control 30 comprises a microprocessor (CPU) 52 programmed by firmware in ROM 54 to execute various sensing and control functions hereinafter described to detect and diagnose failed components and carry out alternative operations to provide continued refrigeration. The microprocessor 52, which is conventional, is interfaced with a number of components such as random access memory (RAM) 56, clock 58 and I/O port 60 in a standard microprocessor architecture. The outputs of thermistors 34 and 36 are applied, through an analog-to-digital converter 62, to the control 30. A direct current voltage Vcc is applied across temperature set point selection devices 38, 40, and the analog voltage present at the wipers of devices 38, 40 are applied to the control 30 as digital signals through another analog-to-digital converter 64. Also applied to the control 30, through an A/D converter 66, is a sense line 68 that monitors the voltage across sensing resistor 67 to determine the current through resistance heater 46 of baffle 32. The operation of a defrost heater 81 is monitored by a sense lead 82 through a relay 84.

The outputs of control 30 are connected, through buffer amplifiers 75, 76, 78 and 80, respectively, to the resistance heater 46 of baffle 32, compressor 26, an evaporator fan 24a and defrost heater 81. Buffer amplifier 75 provides sufficient current to operate the electric heater 46 of baffle 32; fan 24a, compressor 26 and defrost heater 81 are operated by the buffers 76, 78, 80 via relays 70, 72 and 74, respectively.

The control 30 generates an output to a display 86, located in a position convenient to service personnel and preferably visible to the user, to provide an alarm requesting service and indicating the source or sources of failure.

Firmware stored in ROM 54 includes program instructions, or OP code, within one address zone 88 of the ROM, to control the CPU 52 to operate in the manner to be described in detail below. Also stored in ROM 54 are a number of fixed control parameters that are read by the CPU 52 upon diagnosis of a critical component failure to control the refrigerator 10 to continue to preserve food. In the preferred embodiment, the ROM 54 contains as a stored parameter 90 a first fixed temperature (FRZ FIXED TEMP) to which the freezer compartment 20 is set if there is a failure of freezer temperature setting device 38. Stored parameter 92 is a second fixed temperature (FF FIXED TEMP) to which the fresh food compartment 16 is set if there is a failure of fresh food compartment temperature setting device 40. Parameter 94 (BAFFLE OPEN LOOP CONTROL) stored in the ROM 54 is a first open loop parameter for controlling baffle 32 if there is a failure of fresh food thermistor 36, and parameter 96 (COMP OPEN LOOP CONTROL) is an open loop parameter for controlling the compressor if there is a failure of the freezer thermistor 34. Parameters 98 are data for carrying out other open loop control, to be hereinafter explained.

The microprocessor 52 is programmed to operate in the manner described in the flow chart of FIGS. 5a-5g, to be described in detail. As an overview, however, the microprocessor 52 monitors successively the critical input and output devices listed in Table 1 below, and carries out the "fault tolerant control" indicated to continue to preserve food.

TABLE 1

| Fault | Fault Tolerant Control |
|---|---|
| FF Temp Set Point Selection Device | FF Fixed Temp (36 F.) |
| FRZ Temp Set Point Selection Device | FRZ Fixed Temp (0 F.) |
| FF Thermistor | Open Loop Damper Htr Ctrl |
| FRZ Thermistor | Open Loop Compressor Control |
| Baffle Heater Noisy | Open Loop Damper Htr Control |
| Baffle Failed Closed (Heater Open) | Decrease FRZ Temp |
| Baffle Failed Open (Heater Shorted) | Increase FRZ Temp |

With reference now to FIG. 5a, the microprocessor 52 is controlled by firmware in ROM 54 to execute an initialization routine (Step 100) wherein software flags and software timers are reset. Any component faults identified during a previous program execution cycle are transferred to display 86 (Step 102) to provide a visual indication to the user and service personnel of the status of the control. Alarm messages stored in ROM 54 indicate not only the existence of faults but the particular natures of the faults, e.g., "shorted baffle heater" to enable service personnel to expedite repair. The remaining program steps are executed once each second, or at some other arbitrary sampling time, controlled by Step 104.

In Step 106, a defrost cycle is executed if it is currently time to defrost the refrigerator, as established by a defrost subroutine which does not form a part of this invention.

The fresh food compartment temperature set point selection device 40 is now read twice (Step 108) to diagnose the device as either functional or failed. The fresh food temperature set point selection device 40 is read twice to determine whether the control is electrically noisy. In accordance with one aspect of the invention, if the difference between the two successive readings is less than or equal to a predetermined difference [preferably one least significant bit (LSB)], the reading is accepted (Step 110); otherwise, the reading is further tested in Step 112 to determine whether the control 40 is noisy. To identify a noisy device 40, a software counter dedicated to the control is indexed, and the program jumps to Step 120 in FIG. 5b. Each time the program is executed, the counter is incremented if the successive readings do not match indicating that the control 40 is suspected to be noisy. When the counter has reached a predetermined count, e.g., 180, the device 40 is deemed to be noisy, and the fresh food temperature is set by the parameter stored as 92 in ROM 54 (Step 118).

If successive readings of device 40 match, on the other hand, the device 40 is tested to determine whether it is open-circuited or short-circuited (Steps 114, 116). This is carried out by monitoring the absolute level of the analog voltage present at the wiper of device 40. If the voltage at the wiper of the device 40 is predetermined to be higher than a first predetermined level, the device 40 is deemed to be open-circuited. If on the other hand the wiper voltage is determined to be lower than a second predetermined level, the control 40 is deemed to be short-circuited (Step 116). In either case, the set temperature of the fresh food department is obtained from parameter 92 (FF FIXED TEMP) stored in ROM 54, and a flag is set (not shown) to display the fault during the next program cycle (Step 102).

Figure 5B:
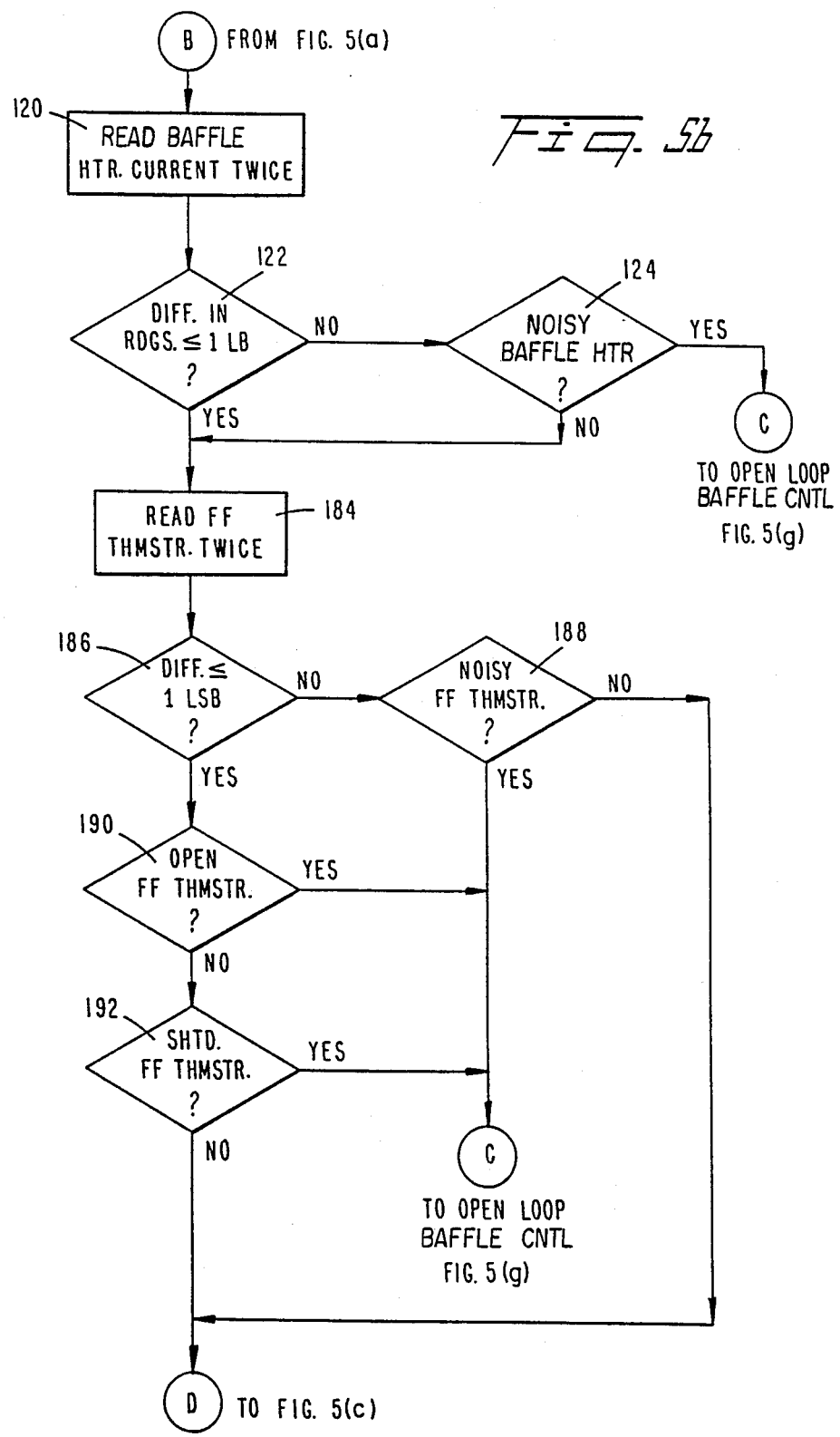

In FIG. 5b, baffle heater current is measured twice, in Step 120, and if any difference in the two readings is obtained (Step 122), a counter is incremented (Step 124) and checked to determine if it has reached a predetermined count. If the predetermined count is reached, the baffle is determined to be electrically noisy and the program jumps to FIG. 5g to carry out open loop baffle control, wherein the baffle heater is cycled on and off at predetermined intervals to place the baffle at an intermediate position to allow some transfer of chilled air from the freezer compartment 20 to the fresh food compartment 16. Referring to FIG. 5g, a timer controlled by the software determines whether a predetermined time has elapsed since the last change in the baffle state (Step 126). If it determines that it is time to change the state of the baffle, it is determined whether the baffle is currently open (on) or closed (off) (Atep 128). If the baffle is currently off, the baffle and evaporator fan are turned on to establish flow of chilled air from the freezer compartment 20 to the fresh food compartment 16 (Step 130).

If on the other hand the baffle is currently on, it is determined whether the compressor is also on (Step 132). If the compressor is off, the baffle which is currently on and the evaporator fan if it is currently on, both are turned off (Step 134). If the compressor is currently on, indicating that the freezer is being satisfied, the baffle is turned off but the evaporator fan is left on to cooperate with the compressor in cooling the freezer (Step 136). A software flag indicating that the baffle heater 46 is noisy (not shown) is set for subsequent display.

The program now continues to FIG. 5d wherein the freezer set point selection device 38 is read twice (Step 138), the difference in successive measurements is determined (Step 140) and whether the device 38 is noisy (Step 142) is determined using the same technique used to determine whether the fresh food set point selection device 40 is noisy. If Step 140 determines that there is no difference in the two readings, device 38 is further tested to determine whether it is open-circuited (Step 144) or short-circuited (Step 146) using the same technique used to determine whether the device 40 is open-circuited or short-circuited. If the control is noisy, open circuited or short circuited, the set point temperature (FRZ FIXED TEMP) for the freezer compartment is read from ROM 54 at parameter 90 (Step 148), and appropriate display flags are set (not shown).

Figure 5E:
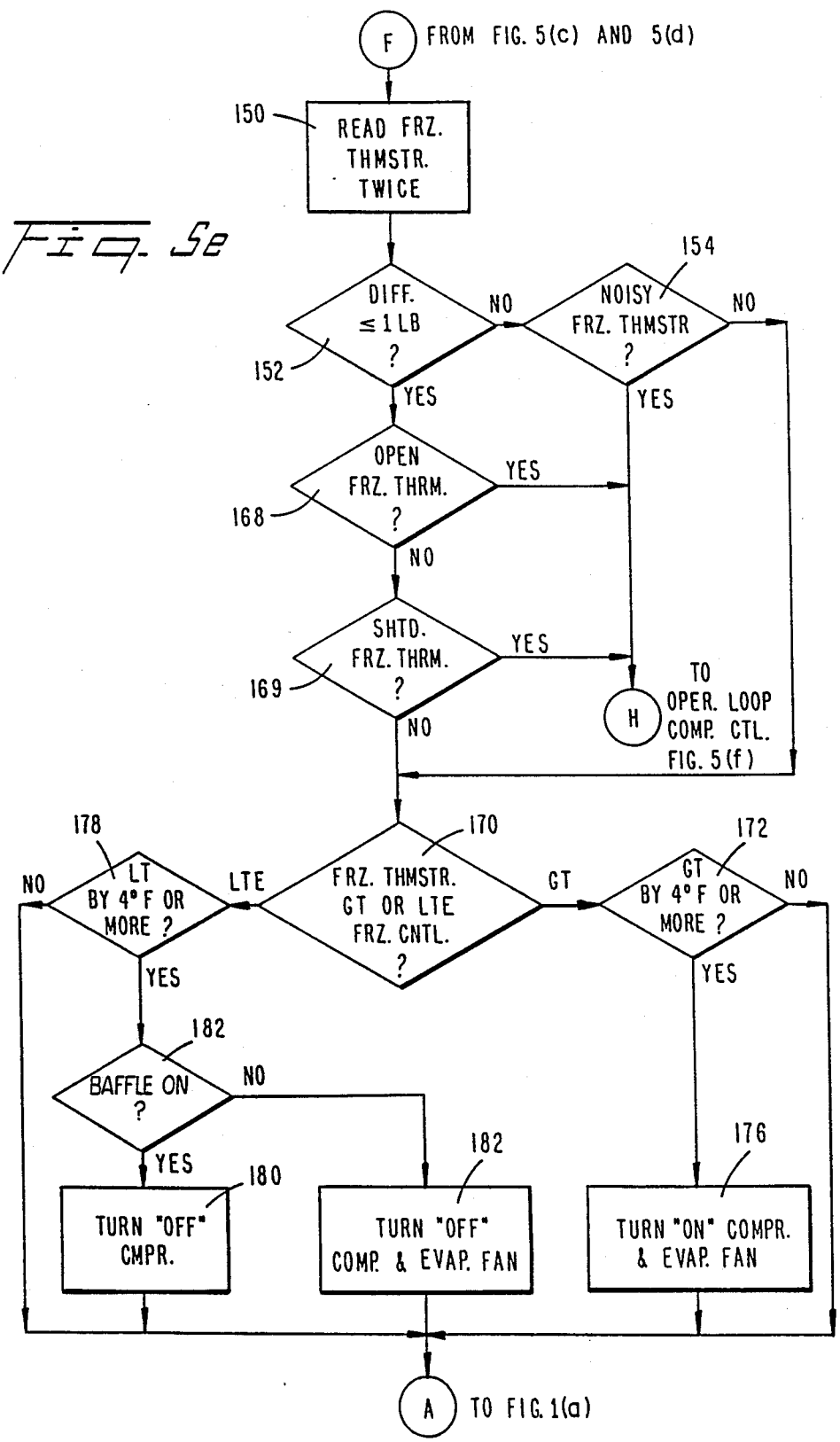
Figure 5G:
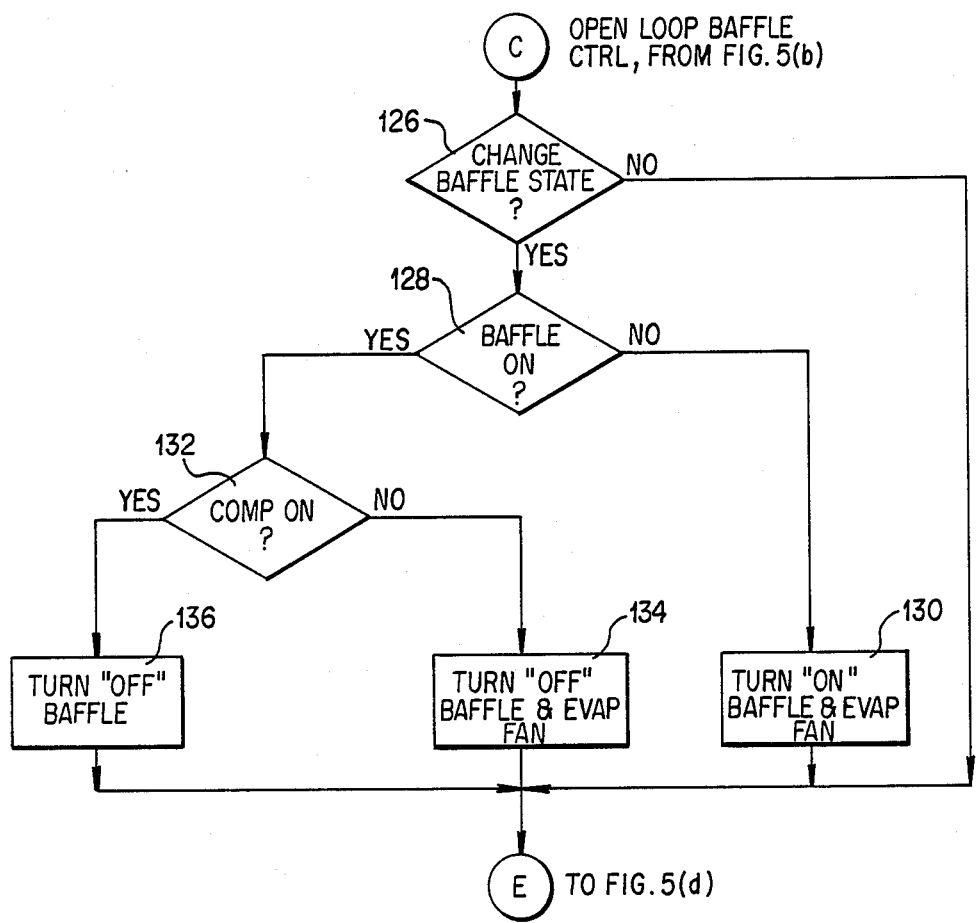

The program continues to FIG. 5e, wherein the freezer compartment thermistor 34 is read twice (Step 150), a difference in successive readings obtained (Step 152) and the result used to determine whether the thermistor is noisy (Step 154) using techniques previously described.

If the freezer thermistor 34 is determined in Step 154 to be noisy, a display flag is set and the program jumps to FIG. 5f wherein open loop compressor control is carried out. In Step 156, a timer controlled by software determines whether a predetermined time has lapsed since the last change in the state of the compressor 26. The length of the predetermined time may be 256 seconds but will depend upon the size of the compressor and thermal characteristics of the refrigerator within which the fault tolerant control of this invention is used. If the predetermined time has lapsed, that is, if it is determined in Step 156 that it is time to turn the compressor on or off, the control determines the current state of the compressor (Step 158). If the compressor is currently off, the compressor and evaporator fan are turned on to force chilled air into the freezer compartment 20 (Step 160). If on the other hand the compressor 26 is currently on, and the baffle 32 is currently off (Step 162), indicating that the fresh food compartment is not calling for cooling, both the compressor and the evaporator fan are turned off (Step 164). If the baffle 32 is on (Step 162), however, the evaporator fan is left on to satisfy the fresh food compartment demand for cooling, and only the compressor 26 is turned off (Step 166). With the predetermined time for changing the state of the compressor fixed, the open loop duty cycle of the compressor will be fifty percent, e.g., alternately on and off for 256 second intervals each.

Execution of the program now returns to Step 104 in FIG. 5a for another execution cycle.

Returning to FIG. 5e, if successive readings of the freezer thermistor 32 are the same, whereby the thermistor is deemed to be not noisy, the thermistor is tested to determine whether it is open-circuited (Step 168) or short-circuited (Step 169). If the thermistor is either open-circuited or short-circuited, an appropriate display flag is set (not shown) and the open loop compressor control routine shown in FIG. 5(f) is carried out.

If the freezer thermistor 32 is determined to be neither open-circuited nor short-circuited, the program continues to Step 170 to execute a compartment temperature control routine.

At step 170, it is first determined whether the value of the freezer compartment thermistor 34 is greater than (GT), or less than or equal to (LTE), the value of the freezer temperature set point device 38. If the temperature value of the freezer thermistor 34 is greater than the value of the freezer set point device 38, the difference between the temperature demanded and temperature measured is obtained to determine whether the difference is greater than four degrees Fahrenheit (Step 172). If the difference is greater than four degrees Fahrenheit, the compressor 26 and evaporator fan 24a are turned on, to cool the freezer compartment 20 (Step 176). If the difference is less than four degrees Fahrenheit, the compressor 26 and evaporator fan 24a are not turned on. This establishes a "dead band" to prevent the compressor 26 and evaporator fan 24a from cycling too frequently.

If the value of the freezer compartment thermistor 34 is less than or equal to the value of the freezer compartment temperature set control 38 (Step 170), and the difference is greater than four degrees Fahrenheit (Step 178), the control determines whether the baffle 32 is currently on (Step 182). If the baffle is currently on (Step 182), only the compressor is turned off. The evaporator fan is left on because the fresh food compartment is being cooled. If the baffle 32 is currently off, both the compressor and evaporator fan are turned off (Step 182). Execution of the program now returns to FIG. 5a at Step 104 for another execution cycle.

Returning to FIG. 5b, if the difference between successive readings in Step 122 is less than one LSB, i.e., the readings match indicating that the baffle heater is not noisy, the fresh food compartment thermistor 36 is measured twice (Step 184). The difference in successive readings is obtained (Step 186) and if the difference is greater than one LSB, indicating that the thermistor may potentially be noisy, the thermistor is further tested in Step 188 using the same technique used to determine if the freezer thermistor is noisy. If the fresh food thermistor 36 is deemed noisy, an appropriate display flag is set (not shown) and the program jumps to FIG. 5g to execute the open loop damper control previously described. If the thermistor 36 is deemed to be not noisy, the program jumps to FIG. 5c.

If the difference in successive readings is less than one LSB, as determined in Step 186, the fresh food compartment thermistor 36 is tested to determine whether it is open-circuited (Step 190) or short-circuited (Step 192). If the thermistor 36 is determined to be either open circuited or short-circuited, an appropriate display flag is set (not shown) and the open loop baffle control routine of FIG. 5(g) is executed. Otherwise, the program continues to FIG. 5c.

With the thermistor 36 deemed to be neither short-circuited nor open-circuited nor noisy, its value is read to determine whether it is greater than, or less than or equal to, the value of the fresh food compartment set point device 40 (Step 194). A "dead band" associated with the fresh food compartment is two degrees Fahrenheit in each direction. Thus, if the value of the fresh food compartment thermistor 36 is at least two degrees greater than the temperature setting of the fresh food compartment, indicating that additional cooling is required (Step 196), the baffle 32 is opened and evaporator fan 24a turned on (Step 198) to cool the fresh food compartment. If the difference is less than two degrees, on the other hand, execution of the program jumps to FIG. 5d wherein freezer compartment control is carried out.

Referring back to FIG. 5c, if the value of the fresh food compartment thermistor 36 is less than or equal to the setting of the fresh food set point device 40, indicating that the fresh food compartment temperature is lower than the desired temperature, and assuming that the difference is greater than two degrees Fahrenheit (Step 200), the control determines whether the compressor 26 is turned on (Step 202). If the compressor is on, the baffle heater 46 is turned off to terminate cooling to the fresh food compartment (Step 206). If the compressor 26 is currently off, the evaporator fan 24a is turned off (Step 204) and baffle heater 46 is also turned off (Step 206).

The condition of the baffle heater 46 is now further analyzed by measuring the voltage across sensing resistor 67 to infer the value of current through the baffle heater (Step 207). If the baffle heater 46 is electrically open-circuited (Step 208), indicating that the baffle 32 is stuck closed, the freezer compartment temperature is lowered (Step 210), to minus five degrees Fahrenheit to cool the fresh food compartment 18 by radiation through the divider wall 14 to continue to preserve fresh food, and a software flag HTR OPEN is set (Step 211). The software flag HTR OPEN is used later in the program (FIG. 5f) to determine whether multiple faults are diagnosed. If the baffle heater 46 is electrically short-circuited (Step 212), on the other hand, indicating that the baffle 32 is probably stuck open, the temperature of the freezer compartment 20 is increased to positive eight degrees Fahrenheit (Step 214) to help prevent food in the fresh food compartment 16 from freezing. A software flag HTR SHTD also to be used later in the program is set (Step 213), and if it has been determined that the baffle heater is either open-circuited or short-circuited, control passes to step 150 in FIG. 5e. If neither condition is present, control passes form Step 212 to Step 138 in FIG. 5d.

One aspect of the control strategy of this invention shown in the flow chart of FIGS. 5e-5g is that upon a diagnosis of multiple failed components wherein one of the failures invokes open loop control of a non-failed component to continue to preserve food and another does not, open loop control will take precedence. For example, if the fresh food temperature set device 40 is diagnosed failed because it is noisy (Step 112), open-circuited (Step 114 of FIG. 5a) or short-circuited (Step 116), a fixed set temperature (FF FIXED TEMP) of the fresh food compartment is obtained from the ROM 54 (Step 118). If a noisy heater is also diagnosed (Step 124 in FIG. 5b), open loop control of the baffle and evaporator fan as described in FIG. 5g is carried out to cool the fresh food compartment independently of the fresh food compartment set temperature FF FIXED TEMP.

In accordance with another aspect of the invention, the on and off duty cycle established for the open loop control of the compressor in FIG. 5f will vary depending upon the particular multiple components diagnosed as failed. For example, if it is diagnosed in Steps 154, 168 and 169 (FIG. 5e) that the freezer compartment thermistor 34 is failed and it is also diagnosed in Step 208 (FIG. 5c) that the baffle 32 is stuck closed, i.e., heater 46 open-circuited, the compressor 26 may be cycled at one duty cycle, such as at 384 seconds on and 256 seconds off, rather than at equal on and off intervals. This is implemented in Step 157 of FIG. 5f by reading the state of the HTR OPEN flag that was set in step 211 of FIG. 5c if the baffle heater was dignosed as failed open-circuited and reading the state of the HTR SHORTED flag that was set in step 213 if the baffle heater was diagnosed as failed short-circuited. If the HTR OPEN flag is determined to be set in step 157, the baffle 32 is stuck closed while the freezer compartment thermistor 34 is failed. To cool the food in the fresh food compartment by radiation from the freezer compartment through the divider wall, the on and off duty cycle of the compressor is changed from its nominal equal 256 second on and off intervals, to, e.g., 384 seconds on and 256 seconds off, to increase cooling by the compressor. If on the other hand the BAFFLE SHTD flag is determined to be set in step 157, the baffle 32 is stuck open while the freezer compartment thermistor 34 is failed. To avoid freezing food stored in the fresh food compartment 16, the duty cycle of the compressor is changed from its equal 256 on and off intervals to, e.g., 256 seconds on and 384 seconds off. The time intervals required in Step 156 to establish on and off duty cycles of the compressor in the particular failure modes described herein are provided by standard software.

The flags HTR OPEN and HTR SHTD are reset in Step 167 following execution of the open loop compressor control routine in FIG. 5f, and the program returns to Step 100 in FIG. 5a.

Thus, the programming described in the flow chart of FIGS. 5a-5f tests and diagnoses critical input and output components of the refrigerator, and upon diagnosis of a failure, controls the refrigerator using non-failed components in a manner to continue to preserve stored food. It is to be understood, however, that other fault tolerant modes of operation are possible, but omitted from the flow charts for brevity. For example, if the compressor 26 fails whereby it will not turn off, the defrost heater 66 may be cycled on and off at predetermined intervals to prevent the freezer 20 and fresh food 18 compartments from becoming too cold. If the compressor will not turn on, on the other hand, a "call service" alarm can be generated immediately to display 86 or elsewhere, e.g., over the telephone lines, to request immediate service.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. In a refrigerator having a cabinet defining a first, below freezing compartment and a second, above freezing compartment, a compressor for cooling said first compartment, a wall having an opening between said compartments, a baffle for selectively closing said opening, first and second temperature sensing means for sensing respectively the temperatures in said first and second compartments, first and second temperature setting means for setting the temperatures respectively of said first and second compartments to user selected first and second temperatures:

memory means for storing plural open loop compressor control parameters; and microprocessor means programmed to be responsive to said first and second temperature sensing means and to said first and second temperature setting means to control selectively said compressor and said baffle to maintain said first and second compartments at said first and second user selected temperatures;

said microprocessor means being further programmed to detect faults in both said first temperature sensing means and said baffle and, in response, to control said compressor using a predetermined one of said plural open loop compressor control parameters stored in said memory means.

2. The apparatus of claim 1, wherein said memory means stores a first compressor open loop control parameter corresponding to the baffle failed open and a second compressor open loop control parameter corresponding to the baffle failed closed, and said microprocessor means is programmed to control said compressor using selectively the first and second open loop control parameters corresponding to a diagnosed condition of said baffle when said first temperature sensing means is diagnosed failed.

3. The apparatus of claim 2, wherein said first compressor open loop control parameter corresponds to an energized and deenergized duty cycle of the compressor lower than that of said second compressor open loop control parameter.

4. In a refrigerator having a cabinet defining a first, below freezing compartment and a second, above freezing compartment, cooling means for cooling said first compartment, a wall defining an opening between said compartments, a baffle operative for selectively opening said closing, operating means for operating said baffle, first and second temperature sensing means for measuring the temperatures of said first and second compartments, temperature setting means for storing user selected first and second compartment temperatures and control means responsive to said temperature sensing means and said temperature setting means for controlling said cooling means to maintain the first compartment at said user selected first compartment temperature and for controlling said baffle to maintain said second compartment at said user selected second compartment temperature;

an operating method, comprising the steps of:

detecting a failure of said baffle and of said first temperature sensing means to operate; and, in response, controlling said cooling means to operate at a first predetermined energized and deenergized duty cycle.

5. The method of claim 1, wherein said detecting step includes detecting whether the baffle is failed open or is failed closed, and wherein said controlling step includes controlling said cooling means to operate selectively at first or second energized and deenergized duty cycles corresponding respectively to whether said baffle is failed open or closed.

6. The method of claim 5, including the step of displaying an indication of a failure.

7. The method of claim 4, wherein said baffle is a type that is movable between open and closed positions in response to temperature, and said refrigerator further has a baffle heater including a resistor for heating said baffle to impart movement thereto, said method further including the steps of storing an open loop baffle control parameter, detecting an electrically noisy electrical heater and, in response to an electrically noisy heater resistor, controlling said baffle with said open loop parameter.

8. The improvement of claim 7, wherein said fault detector means includes means for applying a voltage across said resistive heater means and means for detecting a current flow change through said resistive heater means.

* * * * *